Figure 1:
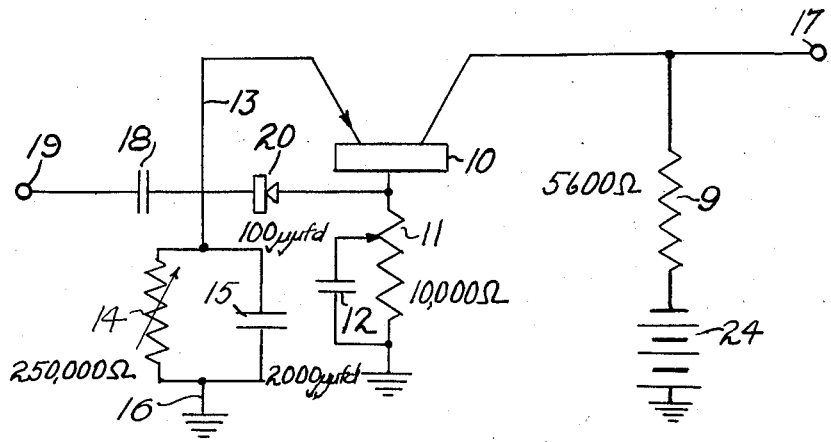

United States Patent Office 2,787,717
Patented Apr. 2, 1957

2,787,717

TRANSISTOR PULSE DELAY CIRCUIT

Bernard Kasmir, New York, N. Y., assignor to Emerson Radio and Phonograph Corporation, New York, N. Y., a corporation of New York Application June 12, 1953, Serial No. 361,190

4 Claims. (Cl. 307—88.5)

The present invention relates to pulse delay circuits and particularly to pulse delay circuits utilizing transistors.

More particularly still the invention relates to pulse delay circuits such as heretofore have embodied multivibrators, such multivibrators being composed ordinarily of a pair of interconnected electron tubes. The present invention produces variable pulse delays through the use of a single transistor in a very simple circuit in place of the two electron tubes and their relatively complex circuits.

Variable delay pulse arrangements have been utilized in many situations. The present circuit is shown in the drawings in an illustrative embodiment adapted particularly for use in a radio altimeter. The altimeter is located in an aircraft and pulses are transmitted therefrom and received thereby after reflection from the ground surface, the time interval between transmission and reception being directly proportional to the altitude of the aircraft. In the particular altimeter, the transmitted pulses are sent out at a constant rate and the received pulses are effective to adjust a servo mechanism and to thereby modify a time delay circuit so that a direct indication is given of the time between the transmission and reception of a particular pulse.

It is the primary object of the invention to provide a pulse delay circuit which is extremely simple and the major component of which is a single point-contact transistor.

Figure 2:
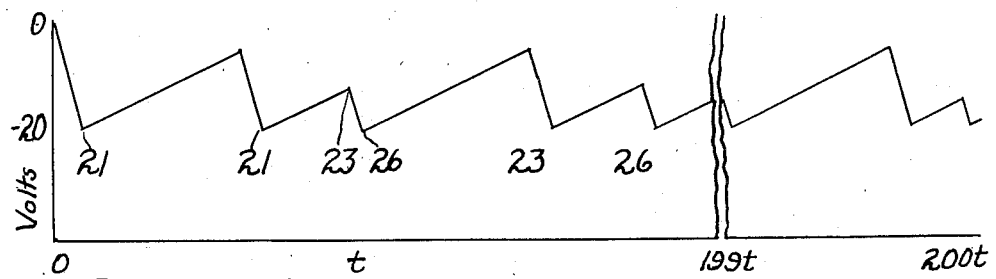
Figure 3:
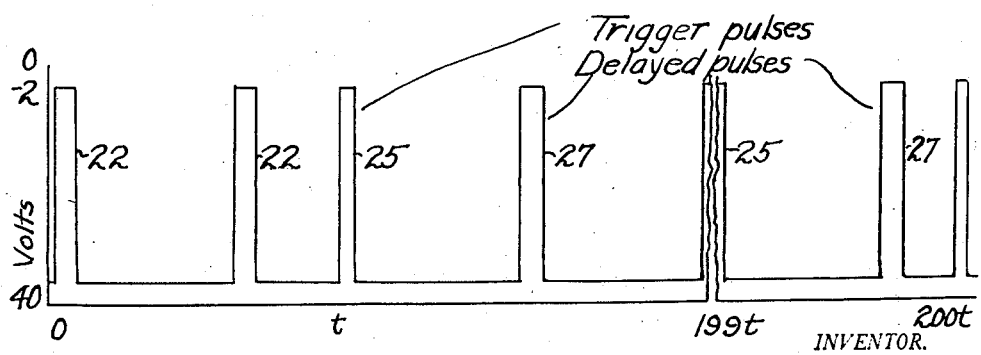

Other objects and features of the invention will be apparent when the following description is considered in connection with the annexed drawings, in which, Figure 1 is a schematic diagram of the transistor pulse delay circuit of my invention;

Figure 2 is a curve showing the emitter wave form comprising the emitter voltage plotted against time; and Figure 3 is a curve showing the collector wave form, the collector voltage being plotted against time.

In Figure 1, the constants shown are illustrative of typical values, the circuit and values shown being those which have been utilized in a transistor pulse delay circuit embodied in a radio altimeter.

Referring now to Figure 1, there is shown at 10 a point contact transistor the base of which is connected through a potentiometer 11 variably shunted by a capacitor 12 to the grounded positive side of a voltage source 24 which source is in the typical instance mentioned, 45 volts. The transistor emitter is connected by means of a conductor 13 to a time delay circuit comprising a variable resistor 14 and capacitor 15 connected in parallel and connected to ground at 16. The transistor collector is connected to the output at 17 and is also connected through load resistor 9 to the negative side of the 45 volt source 24 as shown. Additionally, a negative trigger pulse voltage of the order of 10 volts is applied to the transistor base through the isolating condenser 18 and rectifier 20.

If it be assumed that the various voltages other than the trigger pulse voltage are applied as shown, the emitter wave form will then be a regular sawtooth as indicated at 21 in Figure 2, and the collector wave form will be a series of evenly spaced pulses of identical amplitude and duration as indicated at 22 in Figure 3. This will result from the fact that the application of the negative voltage from source 24 to the collector terminal will cause an electron flow through the emitter circuit and condenser 15 will charge to a predetermined negative voltage by reason of emitter conduction, while the transistor is in the saturation region.

When the capacitor 15 has acquired a sufficient negative charge the transistor 10 will be thrown into its cutoff region, since a sufficiently negative emitter voltage will stop conduction. When the capacitor 15 has discharged sufficiently, the transistor will again pass into its saturation region and become conductive and the second of the series of the pulses 21 will be produced. This pulse will be delayed in time from the original pulse in accordance with the discharge time of the time delay circuit comprising the capacitor 15 and resistor 14, the time delay depending also on the sensitivity of the transistor which can be adjusted by potentiometer 11.

This condition of production of regular sawtooth waves will continue so long as no trigger pulses are applied to the base over the circuit previously described. While such sawtooth wave forms are being produced square shaped pulses of equal amplitude and duration and equally spaced apart in time, such as those shown at 22 in Figure 3, will be produced in the output. (It should be noticed that Figures 2 and 3 have the same coordinates and are drawn to the same scale and can therefore be directly compared.)

If now a trigger pulse is applied to the transistor base at time $t$ as above indicated, it will modify the potential conditions of the transistor and will cause emitter conduction. Thus at the time $t$ and as indicated at 23 in Figure 2 capacitor 15 will commence to charge and will continue to charge until its charge is sufficient to throw transistor 10 into its cutoff region. During the time that capacitor 15 is charging a pulse will appear at the collector output 17, this pulse being indicated at 25 in Figure 3. When conduction is stopped, due to the negative emitter voltage, capacitor 15 will discharge through the variable resistance 14 producing the sawtooth wave 26 as indicated in Figure 2.

When the capacitor has again discharged sufficiently the transistor will again become conductive and will produce a pulse 27 at the collector delayed in time from the preceding pulse 25 in accordance with the discharge time of the time delay circuit comprising capacitor 15 and resistor 14 and depending also on the sensitivity of the transistor which can be adjusted by varying the setting of the potentiometer 11 and which, since it controls the point at which the transistor turns on, may be termed the sensitivity control. The capacitor 15 will again charge until the negative voltage developed thereacross will turn the transistor off, after which capacitor 15 will again discharge until the negative trigger pulse is again applied to the terminal 19 and through condenser 18 and diode rectifier 20 to the base of the resistor.

In order to secure the results set forth the time interval between trigger pulses must be greater than the time period of one sawtooth wave 21 and less than twice the period mentioned.

With the typical values shown in the drawing, the delay pulses will persist for approximately 10 microseconds, the time between trigger pulses will be approximately 320 microseconds and the interval between a trigger pulse and the following delay pulse may be varied between 160 and 320 microseconds. Delays of from 0 to 160 microseconds are not procurable since if the delayed pulses were to occur before 160 microseconds had elapsed, the transistor would turn on again before the 320 microsecond period had elapsed thus producing more than one delayed pulse.

As has been indicated, in use in the typical radio altimeter discussed the trigger pulses are derived from the transmitted pulses and a servo mechanism is operated by the received pulses to adjust the variable resistance 14 to thereby modify the time delay characteristics of the resistor-capacitor circuit comprising resistor 14 and capacitor 15 and thus alter the period of discharge of capacitor 15 resulting in a modified delay in the production of pulse 27.

Reference to Figures 2 and 3 will show that these wave form diagrams have been broken off and show the period from the initial trigger pulse to approximately 350 microseconds thereafter and at the opposite end a period of from approximately 63.7 milliseconds to 64 milliseconds. It will be noticed that the delay pulse at the right hand end is considerably farther from the next preceding trigger pulse than is true at the left hand end of the diagram indicating that there has been a variation of altitude and that the servo mechanism has adjusted the resistor 14 accordingly.

While I have described a typical embodiment of my invention and have illustrated the invention in connection with particular values of circuit components, it will be understood that this was done solely for the purpose of illustration and that many variations of the basic circuit connections as well as of the components involved may be made within the spirit of the invention. I wish therefore to be limited not by the foregoing description, but on the contrary solely by the claims granted to me.

What is claimed is:

1. In a pulse delay circuit, in combination, a point contact transistor having a base, an emitter, and a collector, a source of voltage having its negative terminal connected to said transistor collector through a load resistor, and its positive terminal connected to said transistor base and to ground, a time delay circuit connected between said transistor emitter and ground, said circuit producing a series of identical sawtooth voltage waves in said emitter circuit, means for applying evenly spaced trigger pulses of negative voltage to said transistor base at intervals greater than the time interval between voltage peaks in said emitter circuit and less than twice that time interval to thereby produce alternate normal and trigger induced pulses in said emitter circuit and corresponding square wave voltage pulses in said collector circuit, and means to modify said time delay circuit to thereby modify the slope of said sawtooth waves and vary the time interval between a collector trigger pulse and the following collector normal pulse.

2. A circuit as claimed in claim 1, characterized in that said time delay circuit comprises a capacitor and shunting resistor and further characterized in that said shunting resistor is variable and comprises said modifying means.

3. A circuit as claimed in claim 1, characterized in that means are provided for adjusting the spacing of normal pulses.

4. A circuit in accordance with claim 3, characterized in that said spacing adjusting means comprises a potentiometer and shunting capacitor, said adjusting means being connected between the transistor base and ground.

References Cited in the file of this patent
UNITED STATES PATENTS

| 2,556,286 | Meacham | June 12, 1951 |
| 2,622,213 | Harris | Dec. 16, 1952 |
| 2,644,895 | Lo | July 7, 1953 |
| 2,679,594 | Fromm | May 25, 1954 |
| 2,744,198 | Raisbeck | May 1, 1956 |